US008700611B2

(12) United States Patent
Kelshikar et al.

(10) Patent No.: US 8,700,611 B2
(45) Date of Patent: Apr. 15, 2014

(54) EXTENSIBLE TREE VIEWS FOR MANAGING DATACENTER RESOURCES

(75) Inventors: Manas D. Kelshikar, Cupertino, CA (US); Imran Q. Sayed, Concord, MA (US); Thomas C. Cannon, III, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 102 days.

(21) Appl. No.: 12/685,798

(22) Filed: Jan. 12, 2010

(65) Prior Publication Data

US 2011/0173184 A1 Jul. 14, 2011

(51) Int. Cl.
*G06F 17/30* (2006.01)
(52) U.S. Cl.
USPC .......................................... 707/722; 707/758
(58) Field of Classification Search
USPC ................................................ 707/722, 758
See application file for complete search history.

(56) References Cited

U.S. PATENT DOCUMENTS

| 6,609,123 | B1 * | 8/2003 | Cazemier et al. | 707/100 |
|---|---|---|---|---|
| 8,364,623 | B1 * | 1/2013 | Bunker et al. | 706/47 |
| 2006/0259476 | A1 * | 11/2006 | Kadayam et al. | 707/3 |
| 2006/0259509 | A1 * | 11/2006 | Stolte et al. | 707/102 |
| 2007/0239694 | A1 * | 10/2007 | Singh et al. | 707/3 |
| 2008/0162500 | A1 * | 7/2008 | Dettinger et al. | 707/10 |
| 2009/0178021 | A1 * | 7/2009 | Alluri | 717/104 |
| 2010/0114815 | A1 * | 5/2010 | Longin et al. | 707/603 |
| 2010/0138375 | A1 * | 6/2010 | Hanner et al. | 706/48 |
| 2011/0173619 | A1 * | 7/2011 | Fish | 718/101 |

OTHER PUBLICATIONS

Donoghue et al. ("Learn How You Can Integrate Both Your Physical & Virtual Environments", pp. 1-30, published on Oct. 12, 2009.*

* cited by examiner

*Primary Examiner* — Son T Hoang

(57) ABSTRACT

A method for a GUI for client software that is a part of an application program for managing datacenter resources includes receiving as input one or more specifications, where each specification includes a hierarchy of queries. The method also includes determining one or more target data sources for each query in each hierarchy. Additionally, the method includes issuing the query to each target data source determined for the query, after adapting the query to a format that is acceptable to the target data source. The method further includes receiving the results of each query from the target data source, integrates the results into a hierarchy, and submitting the hierarchy to the client software for display in a tree view in the GUI.

13 Claims, 9 Drawing Sheets

Books.xml

```
<Books>
    <Book isbn="A">
        <Title>Book A</Title>
        <Cites>B</Cites>
        <Cites>C</Cites>
    </Book>
    <Book isbn="B">
        <Title>Book B</Title>
        <Cites>C</Cites>
        <Cites>D</Cites>
    </Book>
    <Book isbn="C">
        <Title>Book C</Title>
        <Cites>D</Cites>
    </Book>
    <Book isbn="D">
        <Title>Book D</Title>
    </Book>
<Books>
```
⎯⎯ 501

Authors.xml

```
<Authors>
    <Author name="Author X">
        <Book>A</Book>
        <Book>B</Book>
    </Author>
    <Author name="Author Y">
        <Book>C</Book>
    </Author>
    <Author name="Author Z">
        <Book>D</Book>
    </Author>
<Authors>
```
⎯⎯ 502

Fig. 5a

|- Book A

||- Author X

|- Book B

||- Author X

||- Book A

|||- Author X

|- Book C    ⟵ 505

||- Author Y

||- Book A

|||- Author X

||- Book B

|||- Author X

|- Book D

||- Author Z

||- Book B

|||- Author X

||- Book C

|||-Author Y

Fig. 5c

Publishers.xml:

```
<Publishers>
    <Publisher name="Random House">
        <Book isbn="D">
            <Price>$10.99</Price>
            <CoverPageUrl>http://www.randomhouse.com/images/dyn/cover/?source=D&height=75</CoverPageUrl>
        </Book>
    </Publisher>
    <Publisher name="Harper Collins">
        <Book isbn="A">
            <Price>$17.49</Price>
            <CoverPageUrl>http://www.harpercollins.com/harperimages/isbn/small/2/A.jpg</CoverPageUrl>
        </Book>
        <Book isbn="B">
            <Price>$7.99</Price>
            <CoverPageUrl>http://www.harpercollins.com/harperimages/isbn/small/2/B.jpg</CoverPageUrl>
        </Book>
        <Book isbn="C">
            <Price>$23.00</Price>
            <CoverPageUrl>http://www.harpercollins.com/harperimages/isbn/small/2/C.jpg</CoverPageUrl>
        </Book>
    </Publisher>
</Publishers>
```

```
<spec id="bookReferenceSpecExtension" extends="bookReferenceSpec"/>
    <node id="book">
        <property name="imageUrl">
            doc("publishers.xml")/Publisher/Book[@isbn = $target/@isbn]/CoverPageUrl
        </property>
        <icon>{imageUrl}</icon>
        <child id="publisher">
            <query> return doc("publishers.xml")/Book[@isbn = $target/@isbn] </query>
        </child>
    </node>
    <node id="publisher" label={@name}/>
</spec>
```
507

|- Book A
||- Author X
||- Harper Collins

EXTENSIBLE TREE VIEWS FOR MANAGING DATACENTER RESOURCES

BACKGROUND

An application program for managing a datacenter runs on a server and can be accessed through a network by a system administrator with a client device such as a laptop computer running client software with a graphical user interface (GUI). Often, the GUI for the client software is integrated with web-browser functionality.

The application program for managing a datacenter enables the management (including load balancing) of many host servers running many virtual machines each having many virtual storage devices such as virtual disks or virtual network interface controllers (NICs).

Multiple object models in the form of graphs can be used to represent the physical resources (e.g., datacenters, host servers, etc.) and virtual resources (e.g., virtual machines, virtual disks, etc.) managed by an application program for managing datacenter resources. In these graphs, a node might represent a resource (e.g., a host server) and an edge between nodes might represent a relationship between resources (e.g., between a host server and a virtual machine). Of course, such graphs tend to be complex, both in terms of the number of nodes involved and in terms of the number of edges between those nodes. Consequently, the graphs do not lend themselves to extensible display in a GUI.

SUMMARY

The first example embodiment provides a method for a GUI for client software that is a part of an application program for managing datacenter resources. The method includes receiving as inputs two object models represented as graphs whose nodes are data elements and whose edges are relationships between data elements. The method filters a tree model from the two graphs using one or more specifications, where each specification contains a hierarchy of queries. Then the method displays the tree model in a tree view in the GUI. In this embodiment, the method generates a single tree from two or more models, where references between the two or more models are merged.

The second example embodiment also provides a method for a GUI for client software that is a part of an application program for managing datacenter resources. The method includes receiving as input one or more specifications, where each specification includes a hierarchy of queries. The method determines one or more target data sources for each query in each hierarchy. Then the method issues the query to each target data source determined for the query, after adapting the query to a format that is acceptable to the target data source. The method then receives the results of the query from the target data source and submits the results as a hierarchy for display in a tree view in the GUI.

In the third example embodiment, a computer-readable storage medium with an executable program stored thereon, is provided. The program instructs a microprocessor to perform the following operations: receiving as inputs two object models represented as graphs whose nodes are data elements and whose edges are relationships between data elements, filtering a tree model from the two graphs using one or more specifications, where each specification contains a hierarchy of queries, displaying the tree model in a tree view in the GUI, and generating a single tree from two or more models, where references between the two or more models are merged.

BRIEF DESCRIPTION OF THE DRAWINGS

FIG. 5a shows two XML data sources for an illustrative use case, in accordance with an example embodiment.

FIG. 5c shows a schematic tree view for the illustrative use case, in accordance with an example embodiment.

FIG. 5d shows another XML data source for the illustrative use case, in accordance with an example embodiment.

FIG. 5e shows a subsequent specification for the illustrative use case and an excerpt from a schematic tree view resulting from processing of the subsequent specification, in accordance with an example embodiment.

DETAILED DESCRIPTION

In the following description, numerous specific details are set forth in order to provide a thorough understanding of the exemplary embodiments. However, it will be apparent to one skilled in the art that the example embodiments may be practiced without some of these specific details. In other instances, process operations and implementation details have not been described in detail, if already well known.

Figure 1:
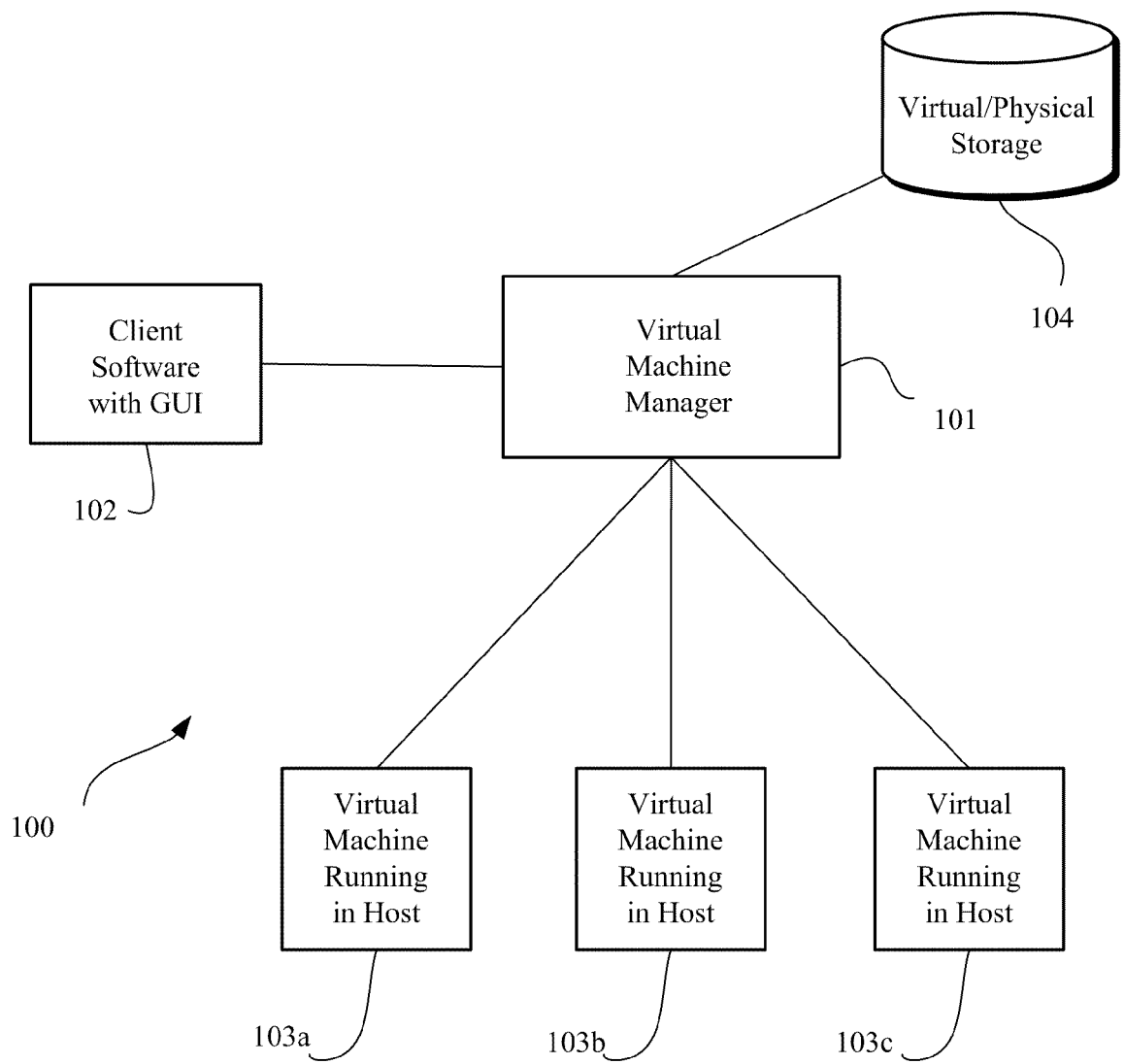
FIG. 1 is a schematic diagram of a system for virtual machine management, in accordance with an example embodiment.

FIG. 1 is a schematic diagram of a system for virtual machine management, in accordance with an example embodiment. As depicted in FIG. 1, a virtual machine manager 101 executes on a server, which in an example embodiment might include volatile memory, persistent storage, and an x86-family microprocessor connected by one or more buses, as well as an associated operating system such as Windows™, Linux™, or MacOS™. The term virtual machine manager as used herein means a management software that provides a mechanism to configure and manage one or more hosts, virtual machines (VMs), and other components of virtualized infrastructure. For example, VMware VC™ provides either same or similar functionality. Similar management softwares are software is also available from vendors such as Microsoft™. The virtual machine manager 101 is connected by a network to a computing device (e.g., a laptop computer) running client software 102 with a GUI. In an example embodiment, the client software 102 is a module of the virtual machine manager 101. However, in another example embodiment, the client software 102 merely interfaces with the virtual machine manager 101, e.g., through an application programming interface (API). Also as suggested above, the client software 102 might integrate with a web browser, e.g., as a plug-in, or be a web application, e.g., an Internet application created with Adobe Flex. The network might be a local area network (LAN), a wide area network (WAN) including the Internet, or some combination of both.

Additionally, the virtual machine manager 101 has access through a bus and/or network to virtual/physical storage 104. In an example embodiment, the network might be a storage area network (SAN).

In the example depicted in FIG. 1, virtual machine manager 101 is also connected by a network to three host servers (103a, 103b, and 103c), each of which might also include volatile memory, persistent storage, and an x86-family microprocessor connected by one or more buses, as well as an associated operating system such as Windows™, Linux™, or MacOS™. Additionally, each host server 103 might be running virtualization software, which enables the creation and execution of a virtual machine running a guest operating system (e.g., Windows™, Linux™, or MacOS™), in an example embodiment.

In an example embodiment, the specification processor described below might be a part of the client software 102 and the tree view described below might be part of the GUI for the client software 102. However, in another example embodiment, the specification processor might be a part of a virtual machine manager 101 with which the client software 102 interfaces through an API. Also, in an example embodiment, the data sources described below might stored on virtual/physical storage 104.

Figure 2:
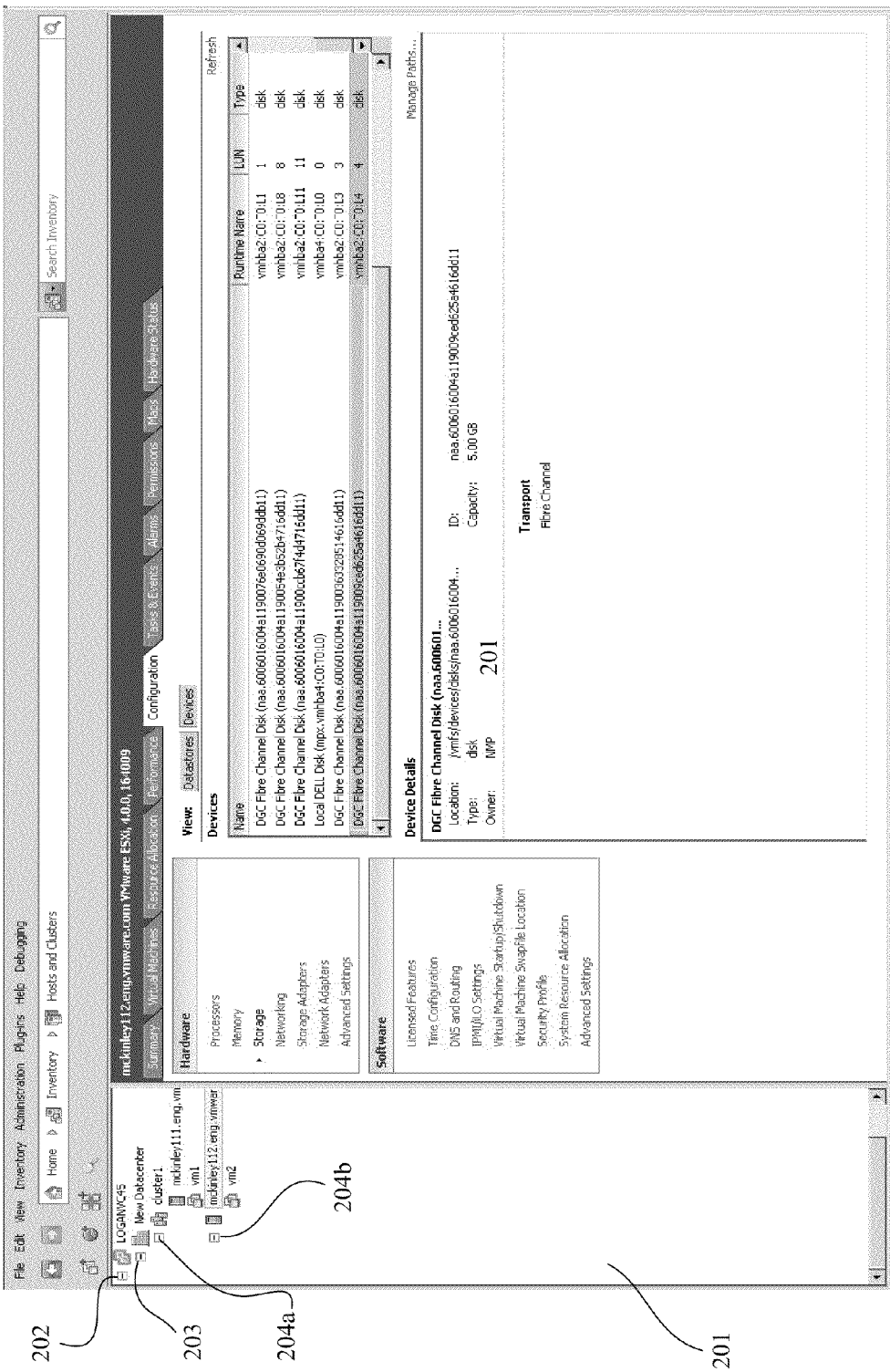
FIG. 2 is a diagram showing a tree view in a GUI, in accordance with an example embodiment.

FIG. 2 is a diagram showing a tree view in a GUI, in accordance with an example embodiment. It will be appreciated that a tree (or outline) view is a widget or control in a GUI that allows for the representation of data in a hierarchy (parent-child) relationship. Typically, tree views support an expand operation which permits the user to see a child branch (or level of a hierarchy) and a collapse operation which hides the child branch. Tree views are supported by many development platforms including Microsoft™ Foundation Classes (MFC), Java™ Swing Classes, and Adobe Flex™.

As depicted in FIG. 2, GUI view 200 includes tree view 201 as a child view. A location (e.g., LDGANVC45) is the root node 202 of the tree or outline depicted in the tree view 201. The child node 203 of the root node 202 is a datacenter (e.g., New Datacenter). In turn, the child node 203 had two children of its own, child node 204a and child node 204b. Child node 204a represents a cluster of hosts (e.g., a cluster of hypervisor hosts). Child node 204b represents host (e.g., a hypervisor). At the leaf level of the tree or outline depicted in tree view 201 are two virtual machines, e.g., vm1 which is a child of node 204a and vm2 which is a child of node 204b. Child node 204a also has a host as a leaf node. In one embodiment, the content of these subnodes (that is, the children of the subnodes such as "cluster") come from different vendors, entities or authors. These content and their format may not be known at the time of designing of GUI view 200.

As indicated above, tree view 201 might be displayed by a GUI for the client software 102, in an example embodiment. In another example embodiment, tree view 201 might be displayed by a GUI for virtual machine manager 101.

Figure 3:
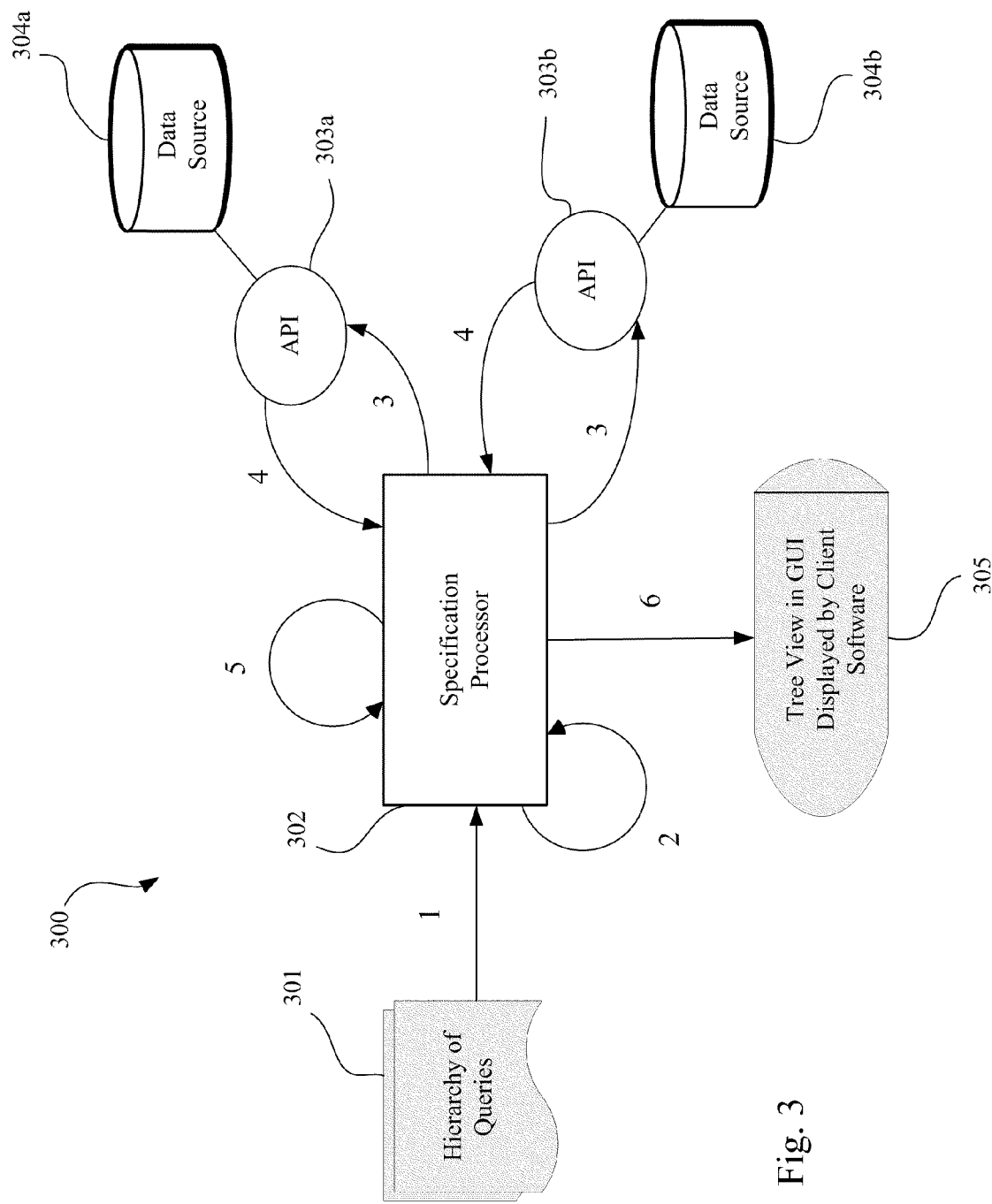
FIG. 3 is a module and sequence diagram showing a process for extending tree views in a GUI, in accordance with an example embodiment.

FIG. 3 is a module and sequence diagram showing a process for extending tree views in a GUI, in accordance with an example embodiment. As depicted in the figure, a specification processor 302 receives input in the form of multiple specifications 301, each of which includes a hierarchy (e.g., parent child relationship) of queries. This is operation 1 in the sequence. As explained in greater detail below, each of the specifications 301 might be written in Extensible Markup Language (XML), in an example embodiment.

It will be appreciated that the specifications 301 might have different authors, in an example embodiment. Thus, the author of one of the specifications might be a developer who designs and implements the GUI for the client software 102 or the developer who designs and implements the virtual machine manager 101. The author of another one of the specifications might be the user. And the author of yet another one of the specifications might be a third-party developer who enhances the client software 102 or the virtual machine manager 101, e.g., with a plug-in for a web browser. That is to say, a specification might be authored by any person with adequate knowledge of the datacenter's object models or associated graphs persistently stored in the data sources (e.g., data source 304a or data source 304b).

Moreover, in an alternative example embodiment, the underlying application program might not be a virtual machine manager, but rather an application program that manages virtual resources other than virtual machines, e.g., virtual storage. Or the application program might be an application program that manages physical storage.

In operation 2 of the sequence shown in FIG. 3, the specification processor 302 might adapt a query from one of the specifications so that it is in a format acceptable to the data source associated with the query. For example, a query might be written in XQuery/XPath but the data source associated with the query might be a Structured Query Language (SQL) database instead of an XML database. The specification processor 302 would translate the query from XQuery/XPath to a SQL command (or more generally, an API call) before proceeding to operation 3 of the sequence. It will be appreciated that two or more XQuery/XPath queries might result in only a single SQL command, e.g., through the use of relational algebra. Similarly, a single XQuery/XPath query might result in two or more SQL commands. That is to say, the relationship between queries and API calls can be one-to-many, many-to-one, or many-to-many.

In operation 3 of the sequence shown in FIG. 3, the specification processor issues a call to an API associated with a data source. As depicted in FIG. 3, API 303a is associated with data source 304a and API 303b is associated with data source 304b. As suggested earlier, data source 304a might include data that is different from the data in data source 304b, both in terms of format and in terms of content. For example, data source 304a might be a SQL database and data source 304b might be an XML database, e.g., XML-enabled or native XML. In operation 4 of the sequence, the specification processor 302 receives the results (e.g., which might be the requested data or a Boolean value indicating absence of the requested data) from the API calls made in operation 3.

In operation 5 of the sequence shown in FIG. 3, the specification processor might combine data received from disparate data sources before creating the hierarchy to populate a tree (or outline) view. Then in operation 6 of the sequence, the specification transmits the hierarchy to other modules in the client software for display in a tree view in the client software's GUI.

Here it will be appreciated that there might be other uses for the hierarchy than populating a tree view in a GUI. That is to say, the hierarchy might be used as an intermediate representation that is input into another process (e.g., a process which performs a search) that does not involve the display of a view or even the model-view-controller (MVC) design pattern.

Figure 4:
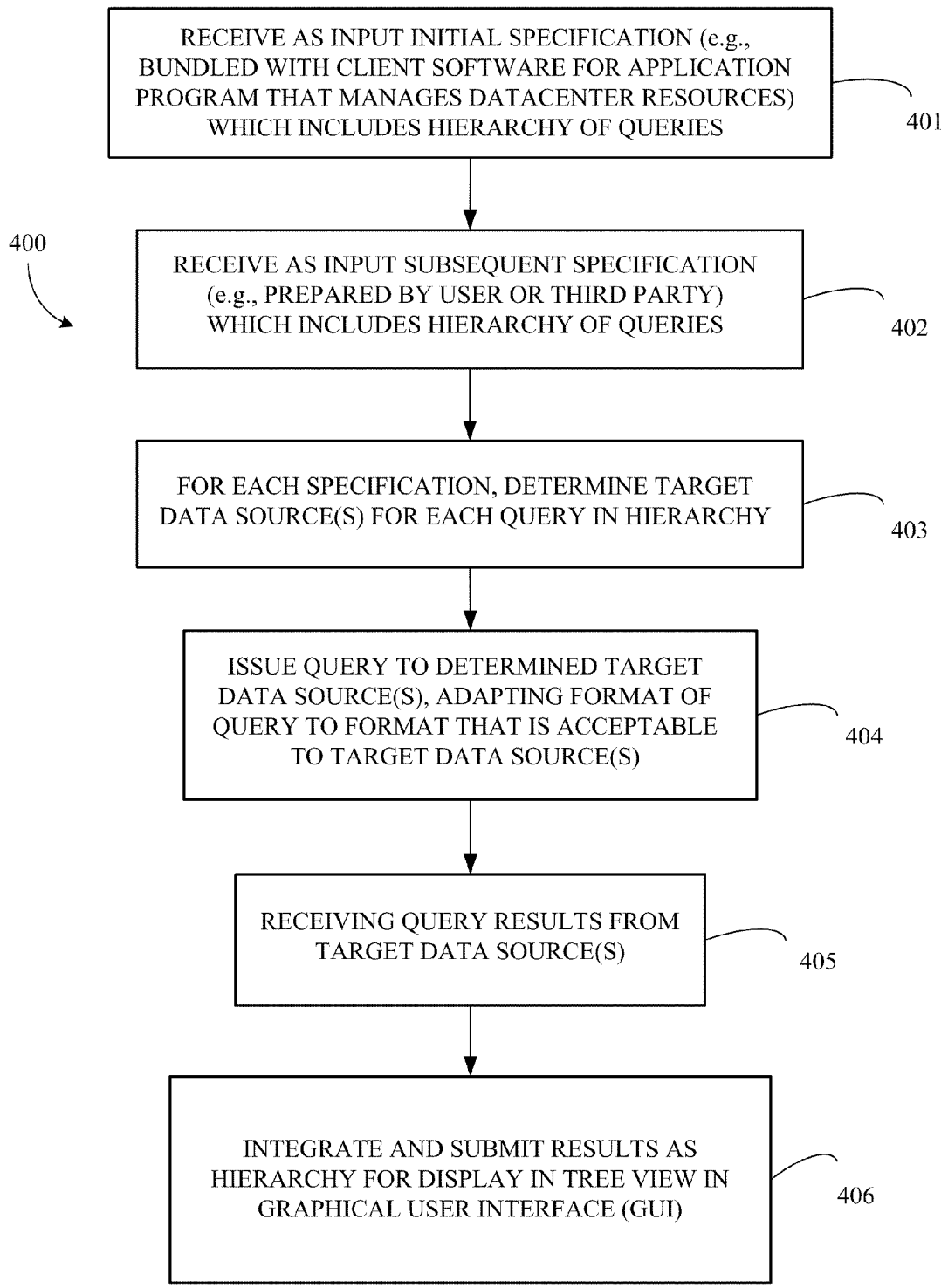
FIG. 4 is a flowchart diagram showing a process for extending tree views in a GUI, in accordance with an example embodiment.

FIG. 4 is a flowchart diagram showing a process for extending tree views in a GUI, in accordance with an example embodiment. It will be appreciated that this process might be executed by client software 102 or virtual machine manager 101, in example embodiments. In operation 401 of the process, the specification processor receives as input an initial specification which includes a hierarchy of queries. In an example embodiment, the initial specification might have been bundled with client software for an application program that manages datacenter resources. In operation 402 of the process, the specification processor receives as input a subsequent specification which includes a hierarchy of queries. In an example embodiment, the subsequent specification might have been prepared by the user or a third-party to extend the initial specification. Here it will be appreciated that preparation of such a subsequent specification requires knowledge of the object models or graphs that represent the related resources managed by the application program that includes the specification processor.

In operation 403, the specification processor determines one or more target data sources (e.g., XML database or SQL database) for each query in each specification. Then in operation 404, the specification processor issues the query to each target data source, adapting the format of the query to a format that is acceptable to the target data source. Here, it will be appreciated that the query might be unchanged from the query in the specification, as described in greater detail below. Alternatively, the query might be translated to an API call as discussed earlier. Or the query might be combined with other queries by the specification processor, using, for example, a relational algebra.

In operation 405, the specification processor receives the query results from each target data source. As noted above, the results might be data values (including character strings as described below) or Boolean values that indicate the absence of data values. Then in operation 406, the specification processor integrates and submits the results as a hierarchy for display in tree view in a GUI by, for example, client software for an application program that manages datacenter resources. Here it will be appreciated that integration might involve inserting data at various locations into a hierarchy that can be used to populate the tree view. In an example embodiment described below, this hierarchy might be driven by the initial specification and the subsequent specification that extends the initial specification. Also in an example embodiment, other modules (e.g., window modules) in the client software might be responsible for the actual display of the hierarchy assembled by the specification processor.

FIGS. 5a to 5e illustrate a use case showing how a specification processor in accordance with this disclosure might operate. For ease of understanding the use case involves the creation of a tree view for books rather than datacenter resources.

FIG. 5a shows two XML data sources for the illustrative use case. As depicted in the figure, data source 501 is an XML database whose file is identified as Books.xml. In Books.xml, each parent node is a Book identified by an "isbn" (International Standard Book Number). In turn, each Book can have child nodes that include (a) a Title and (b) another book cited by the parent book (Cites).

Data source 502, also shown in FIG. 5a, is an XML database whose file is identified as Authors.xml. Each parent node is an "Author name" identified by a name. Each "Author name" can have child nodes consisting of each Book that the named author has written.

Figure 5B:
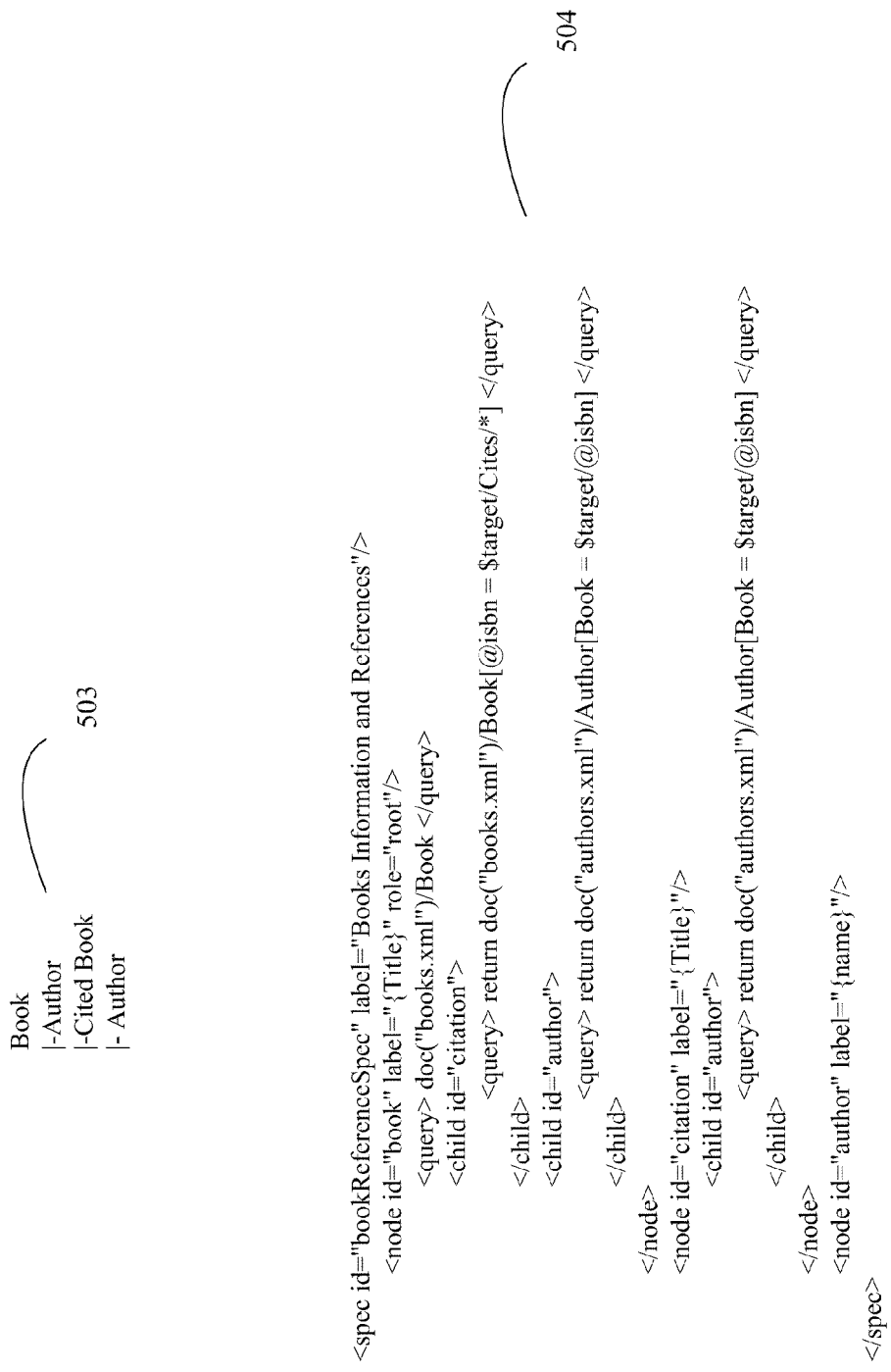
FIG. 5b shows a generalization of a desired tree view and an initial specification for the illustrative use case, in accordance with an example embodiment.

FIG. 5b shows a generalization 503 of the tree view that is desired by the author of the initial specification 504. The initial specification 504 is also shown in this figure. In the generalization 503, a parent Book includes two child branches, Author and Cited Book, and the Cited Book branch has its own child branch, Author.

In FIG. 5b, the initial specification 504 is identified as "bookReferenceSpec". The nodes of the initial specification 504 frame four queries expressed in XQuery/XPath arranged in a hierarchy. The first two queries have a target data source of Books.xml.

The first query queries Books.xml for a parent "book":

```
<query> doc("books.xml")/Book </query>
```

The second query queries Books.xml for a child "citation":

```
<query> return doc("books.xml")/Book[@isbn = $target/Cites/*]
</query>
```

The third and fourth queries have a target data source of Authors.xml. The third query queries Authors.xml for the "author" of the parent book:

```
<query> return doc("authors.xml")/Author[Book = $target/@isbn]
</query>
```

And the fourth query, which is the same as the third query, queries Authors.xml for the "author" of the book returned as a "citation".

It will be appreciated that each of these queries identifies the target data source. However, in an alternative example embodiment, the target data source might be identified in another part of the specification.

It will also be appreciated that the initial specification 504 depicted in FIG. 5b has a unique identifier which a subsequent specification might use to create an association between specifications. Further, in this example, each branch in the tree view corresponds to a node in the initial specification 504. Thus, there are individual nodes in the initial specification 504 for books, authors, and citations.

Additionally, the queries to compute the children of a parent node are described in the specification as child nodes under the corresponding parent node. The data object in the data source corresponding to a given node is referred to as "$target" in the queries, in this example. A specification node refers to the attributes of the corresponding data object using tokens of the form "{foo}", where foo is "Title", "@isbn", etc. In this example, these tokens will be replaced by actual values once they are retrieved from a data source by the specification processor.

FIG. 5c shows the schematic tree view 505 which results from processing of the initial specification 504 against the data sources 501 and 502. The first parent node (I-) in the schematic tree is for Book A, which has a child node (II) for Author X, but which has no child nodes for citing books. The second parent node (I-) is for Book B, which also has child node (II) for Author X (he/she wrote both Book A and Book B) and a child node (II) for Book A, which cites Book B and which has its own child node (III) for Author X. The third parent node (I-) is for Book C, which has a child node (II) for Author Y, a child node (II) for Book A which cites Book C and which has its own child node (III) for Author X, and a child node (II) for Book B which also cites Book C and which has its own child node (III) for Author X. The fourth and final parent node (I-) is for Book D, which has a child node (II) for Author Z, a child node (II) for Book B, which cites Book D and which has its own child node (III) for Author X, and a child node (II) for Book C, which also cites Book D and which has its own child node (III) for Author Y.

FIG. 5d shows another XML data source for the illustrative use case, in accordance with an example embodiment. As shown in this figure, data source 506 is an XML database whose file is identified as Publishers.xml. In Publishers.xml, each parent node is a "Publisher name" identified by a name. In turn, each "Publisher name" has child nodes consisting of each published "Book isbn". And each "Book isbn" can have child nodes that include a price and a "CoverPageURL".

FIG. 5*e* shows a subsequent specification for the illustrative use case. The subsequent specification 507 is identified as "bookReferenceSpecExtension" which explicitly extends the initial specification 504. The subsequent specification 507 includes a reference and a query that are expressed in XQuery/XPath and that have a target data source of Publishers.xml. The reference references Publishers.xml for the CoverPageURL for a book. The query queries Publishers.xml for a child "publisher" for a parent book:

```
<property name="imageUrl">
    doc("publisher.xml")/Publisher/Book[@isbn = $target/@isbn]/
    CoverPageUrl
</property>
<icon>{imageUrl}</icon>
<child id="publisher">
    <query> return doc("publishers.xml")/Book[@isbn = $target/@isbn]
    </query>
</child>
```

FIG. 5*e* also shows an excerpt 508 from a schematic tree view which results from processing of the initial specification 504 and the subsequent specification 507 against the data sources 501, 502, and 506. The excerpt 508 consists of a parent node (I-) in a schematic tree view for Book A, which has a child node (II) for Author X, and a child node (II) for Harper Collins which is the publisher of Book A.

It will be appreciated that the data source 501 and the data source 506 both identify a book by its ISBN and thereby allow the specification processor to join the data associated with an ISBN from both data sources when populating the hierarchy that will eventually be displayed in the tree view. Likewise the data source 501 and the data source 502 both identify books by their title and allow for the joining of the data associated with a title.

Any of the operations described herein that form part of the inventions are useful machine operations. The inventions also relate to a device or an apparatus for performing these operations. The apparatus may be specially constructed for that purpose or it may be a general-purpose computer selectively activated or configured by a computer program stored in the computer. In particular, various general-purpose machines may be used with computer programs written in accordance with the teachings herein or it may be more convenient to construct a more specialized apparatus to perform the operations.

The inventions can also be embodied as computer readable code on a computer readable medium. The computer readable medium is any data storage device that can store data which can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network-coupled computer system so that the computer readable code is stored and executed in a distributed fashion.

It will be further appreciated that the instructions represented by the operations in the above figures are not required to be performed in the order illustrated and that all of the processing represented by the operations might not be necessary to practice the inventions. Further, the processes described in any of the above figures can also be implemented in software stored in any one of or combinations of the RAM, the ROM, or the hard disk drive.

Although the foregoing inventions have been described in some detail for purposes of clarity of understanding, it will be apparent that certain changes and modifications can be practiced within the scope of the appended claims. For example, the foregoing inventions might be used in a GUI for displaying complicated object models other than the object models associated with datacenters, for example, an object model associated with an organizational chart for a large organization. Also it will be appreciated that there are many other possible orderings of the operations in the processes described above and many possible modularizations of those orderings. In addition, one skilled in the art will appreciate that there are many other possible displays for tree-like data besides the vertical displays with expanding and collapsing nodes illustrated herein, all of which can be incorporated with the embodiments described above. Accordingly, the present embodiments are to be considered as illustrative and not restrictive, and the invention is not to be limited to the details given herein, but may be modified within the scope and equivalents of the appended claims. In the appended claims, elements and/or operations do not imply any particular order of operation, unless explicitly stated in the claims or implicitly required by the disclosure.

The invention claimed is:

1. A method for managing datacenter resources using extensible tree views, comprising:

receiving a plurality of specifications as inputs, wherein each specification includes a plurality of queries arranged in a hierarchy;

for each specification received as an input, determining one or more target data sources for each query in the hierarchy of the corresponding specification;

issuing the query to each target data source determined for the query, including adapting the query to a format that is acceptable to the target data source;

receiving results of the query from the target data source; and submitting the results as a hierarchy compatible for displaying in a tree view in a graphical user interface (GUI) for an application program selected from a group consisting of application programs that manage virtual machines, application programs that manage virtual resources, and application programs that manage physical storage and the submitted results being compatible for being used as an intermediate representation that is input into a process that does involve displaying the tree view, wherein each operation of the method is executed by a microprocessor, the tree view comprises a root node that represents a location, a child node of the root node that represents a datacenter, a plurality of sub-child nodes of the child node that represent hosts, and a plurality of leaf nodes of each of the sub-child nodes that represent virtual machines, the tree view supports an expand operation which permits a user to see configuration information of a particular sub-child node, wherein the expand operation shows a tabbed interface with multiple tabs, wherein one of the multiple tabs includes hardware categories of the particular sub-child node and software categories of the particular sub-child node, wherein choosing a particular category allows the user to see one or more hardware or software items in the particular category, and choosing one of the hardware or software items in the particular category allows the user to see detailed information of the one of the hardware or software items, each of the plurality of queries maps to a particular branch in the tree view, for at least some of the plurality of queries, the adapting of the query to the format that is acceptable to the target data source includes combining data from a particular query in a particular one of the plurality of specifications with data from another query in another one of the plurality of specifications to generate an application program interface (API) call to the target data source, and the one or more target data sources include a Structured Query Language (SQL) database or an Extensible Markup Language (XML) database, and wherein at least one query to the SQL database is written in XML Query (XQuery) or XML Path Language (XPath).

2. The method of claim 1, wherein the one or more target data sources are derived from an identifier in the corresponding specification.

3. The method of claim 1, wherein the determination of the one or more target data sources depends at least in part on data included the query.

4. The method of claim 1, further comprising an operation of integrating the submitted results from at least two target data sources.

5. The method of claim 1, wherein a relational algebra is used to combine the data from the particular query and the other query to generate a single API call to the target data source.

6. The method of claim 1, wherein issuing the query to each target data source includes passing query data through the API call.

7. The method of claim 1, wherein the combining includes combining the data from the particular query and the other query generate a single API call to the same target data source.

8. The method of claim 1, wherein the tree view further supports a collapse operation which hides the configuration information of the particular sub-child node.

9. A non-transitory computer-readable storage medium with an executable program stored thereon, wherein the program instructs a microprocessor to perform a method of managing datacenter resources using extensible tree views comprising the following operations:

receiving a plurality of specifications as inputs, wherein each specification includes a plurality of queries arranged in a hierarchy;

for each specification received as an input, determining one or more target data sources for each query in the hierarchy of the corresponding specification;

issuing the query to each target data source determined for the query, including adapting the query to a format that is acceptable to the target data source;

receiving results of the query from the target data source; and submitting the results as a hierarchy compatible for displaying in a tree view in a graphical user interface (GUI) for an application program selected from a group consisting of application programs that manage virtual machines, application programs that manage virtual resources, and application programs that manage physical storage and the submitted results being compatible for being used as an intermediate representation that is input into a process that does involve displaying the tree view, wherein each operation of the method is executed by a microprocessor, the tree view comprises a root node that represents a location, a child node of the root node that represents a datacenter, a plurality of sub-child nodes of the child node that represent hosts, and a plurality of leaf nodes of each of the sub-child nodes that represent virtual machines, the tree view supports an expand operation which permits a user to see configuration information of a particular sub-child node, wherein the expand operation shows a tabbed interface with multiple tabs, wherein one of the multiple tabs includes hardware categories of the particular sub-child node and software categories of the particular sub-child node, wherein choosing a particular category allows the user to see one or more hardware or software items in the particular category, and choosing one of the hardware or software items in the particular category allows the user to see detailed information of the one of the hardware or software items, each of the plurality of queries maps to a particular branch in the tree view, for at least some of the plurality of queries, the adapting of the query to the format that is acceptable to the target data source includes combining data from a particular query in a particular one of the plurality of specifications with data from another query in another one of the plurality of specifications to generate an application program interface (API) call to the target data source, and the one or more target data sources include a Structured Query Language (SQL) database or an Extensible Markup Language (XML) database, and wherein at least one query to the SQL database is written in XML Query (XQuery) or XML Path Language (XPath).

10. The computer-readable storage medium of claim 9, wherein the one or more target data sources are derived from an identifier in the corresponding specification.

11. The computer-readable storage medium of claim 9, wherein the determination of the one or more target data sources depends at least in part on data included the query.

12. The computer-readable storage medium of claim 9, further comprising an operation of integrating the submitted results from at least two target data sources.

13. The computer-readable storage medium of claim 9, wherein the tree view further supports a collapse operation which hides the configuration information of the particular sub-child node.

* * * * *